(12) United States Patent
Meredith et al.

(10) Patent No.: US 8,244,763 B1
(45) Date of Patent: *Aug. 14, 2012

(54) WIKI-FACILITATED ENTERPRISE ARCHITECTURE REPOSITORY

(75) Inventors: Eric P. Meredith, Bridgeville, PA (US); Chad T. Jeffers, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 641 days.

This patent is subject to a terminal disclaimer.

(21) Appl. No.: 12/338,774

(22) Filed: Dec. 18, 2008

(51) Int. Cl.
*G06F 17/30* (2006.01)
(52) U.S. Cl. ......................... 707/791; 707/803
(58) Field of Classification Search .................. None
See application file for complete search history.

(56) References Cited

U.S. PATENT DOCUMENTS

| | | | |
|---|---|---|---|
| 7,685,140 B2 | 3/2010 | Jackson | |
| 7,716,254 B2 | 5/2010 | Sarkar et al. | |
| 7,752,070 B2 | 7/2010 | Hatcher et al. | |
| 7,756,735 B2 | 7/2010 | Sessions et al. | |
| 2002/0026630 A1 | 2/2002 | Schmidt et al. | |
| 2004/0143470 A1* | 7/2004 | Myrick et al. | 705/7 |
| 2004/0236618 A1 | 11/2004 | Smith et al. | |
| 2006/0235984 A1* | 10/2006 | Kraus et al. | 709/228 |
| 2007/0162268 A1* | 7/2007 | Kota et al. | 703/14 |
| 2007/0288275 A1 | 12/2007 | Kumar | |
| 2008/0040674 A1 | 2/2008 | Gupta | |
| 2008/0255997 A1 | 10/2008 | Bluhm et al. | |
| 2009/0113378 A1* | 4/2009 | Boyer et al. | 717/101 |
| 2010/0030893 A1 | 2/2010 | Berg | |
| 2010/0037305 A1* | 2/2010 | Griffith et al. | 726/7 |
| 2010/0107165 A1 | 4/2010 | Koskimies et al. | |
| 2010/0138250 A1 | 6/2010 | Brown et al. | |
| 2010/0293182 A1 | 11/2010 | Karhinen et al. | |

OTHER PUBLICATIONS

U.S. Appl. No. 12/555,943, filed Sep. 9, 2009.
U.S. Appl. No. 12/555,951, filed Sep. 9, 2009.
Office Action mailed Apr. 19, 2012 in U.S. Appl. No. 12/555,943.

* cited by examiner

*Primary Examiner* — Yuk Ting Choi
(74) *Attorney, Agent, or Firm* — Buchanan Ingersoll & Rooney PC; Robert J. Pugh

(57) ABSTRACT

An enterprise architecture storage and organization system is provided which includes user-editable webpages to display enterprise architecture content. The webpages are organized in a framework, such as the Zachman Framework. The framework may comprise a plurality of units grouped into a plurality of levers and a plurality of categories. Each unit may have a user-editable webpage associated with it. The level of detail included within each user-editable webpage is variant depending upon the location of its associated unit in the framework. Units at the top of the framework contain broad or general information and the level of detail downwardly increases. Users may selectably edit the content of the user-editable webpages using an editor. Users may edit the text and edit and attach graphics. In some embodiments, wiki-type functionality may be utilized.

14 Claims, 14 Drawing Sheets

1.1. DEFINITION/SCOPE

[Z] THIS TOPIC IS FREQUENTLY COMPRISED OF A SHORT NARRATIVE FOLLOWED BY A BULLETED LIST, OR A SIMPLE BLUEPRINT GRAPHIC. THIS TOPIC IS SOMETIMES DIFFICULT BECAUSE IT IS SO OBVIOUS. ALL THAT IS NEEDED HERE IS A SHORT NARRATIVE WITH A BULLETED LIST OF THE TOPICS, ITEMS, ISSUES, OR THINGS IMPORTANT TO THE BUSINESS.

THINK ABOUT THE THINGS YOU MONITOR AND MEASURE, AND THE THINGS YOU INCLUDE IN PERFORMANCE REPORTS. THESE ARE LIKELY THE THINGS IMPORTANT TO THE ENTITY. KEEP IT HIGH LEVEL, AND AVOID MENTIONING SPECIFIC REPORTS, METRICS, OR GOALS/QUOTAS. "ENGINE EFFICIENCY" IS VALID FOR THE SCOPE LEVEL, WHEREAS "NUMBER OF OIL CHANGES" IS NOT.

EXAMPLES OF BUSINESS-RELATED TOPICS AND/OR HIGH LEVEL TECHNICAL THINGS THAT ARE IMPORTANT TO THE ENTITY MIGHT INCLUDE:

- RELIABILITY
- SERVER PERFORMANCE
- PROFITABILITY
- INFORMATION SECURITY
  - CONFIDENTIALITY
  - INTEGRITY
  - AVAILABILITY

[☑] IF YOUR TEAM MANAGES DATABASE TECHNOLOGY, THEN MAKE SURE DATABASE MANAGEMENT IS IN THE NARRATIVE (FOR EXAMPLE).

[☑] MAKE SURE TO INCLUDE THE THINGS YOU MEASURE SUCH AS UP-TIME, CUSTOMER SATISFACTION, COSTS - AND OTHER QUANTIFIABLE VALUE YOU COMMUNICATE.

FIG.5A

THE DATABASE GROUP'S PRIMARY OBJECTIVE INCLUDE:

* MANAGING AND IMPLEMENTING CHANGE REQUESTS
* MANAGING AND IMPLEMENTING NEW DATABASE PROJECTS
* INCREASING SPEED TO MARKET EFFICIENCIES
* STANDARDIZATION OF SUPPORTED ARCHITECTURES
* IMPLEMENTATION OF STANDARD REPEATABLE PROCESSES
  * PROJECT MANAGEMENT INTERFACING
  * PROACTIVE DATABASE MONITORING
  * QUALITY OF SERVICE

%STOPINCLUDE%  ← 184

% COMMENT{ type=" tableprepend " }%
| RETHINK THIS SIMPLE LIST AND PLACE ON IT THE 'ITEMS OF IMPORTANCE BASED ON THE REPORTS YOU PRODUCE, THE PRESENTATIONS YOU GIVE, AND THE ACCOUNTABILITIES YOU MANAGE. </td><td> MAIN . ERICMEREDITH </td><td> 01 JUL 2007 - 20:53 ||

MORE

DONE

FIG.6B

SHOW: CLICK ON *SHOW ALL ATTACHMENTS* TO DISPLAY A LIST OF ALL EXISTING ATTACHMENTS.

COPYRIGHT © PNC FINANCIAL SERVICES. ALL MATERIAL ON THIS WIKI IS CONSIDERED CONFIDENTIAL AND THE PROPERTY OF THE PNC FINANCIAL SERVICES GROUP. IDEAS, REQUESTS, PROBLEMS REGARDING THE EA WIKI? SEND FEEDBACK
SYNDICATE THIS SITE   RSS   ATOM

DONE

TOOLS AND RESOURCES ← 230

OPTIONAL

< AUTHOR HELP HERE ← 164

ADD COMMENT

SECTION 9.5 SHOULD HAVE A COMMON LINK FOR ALL ENTITIES THAT POINTS TO THE ITS HOME PAGE.    PAULGOSTKOWSKI?  28 JUN 2007 - 11:44

MISSING CONTENT FOR 9.1, 9.2, AND 9.3    PAULGOSTKOWSKI?  28 JUN 2007 - 11:43

R4 - 29 JUN 2007 - 13:33:50 - CHADJEFFERS

COPYRIGHT © PNC FINANCIAL SERVICES. ALL MATERIAL ON THIS WIKI IS CONSIDERED CONFIDENTIAL AND THE PROPERTY OF THE PNC FINANCIAL SERVICES GROUP. collaborate with TWiki
IDEAS, REQUESTS, PROBLEMS REGARDING THE EA WIKI? SEND FEEDBACK
SYNDICATE THIS SITE    RSS    ATOM

WIKI-FACILITATED ENTERPRISE ARCHITECTURE REPOSITORY

BACKGROUND

The collection and organization of Architecture Documentation or other departmental information is an important process designed to enhance interdepartmental communications, improve employee interactions, as well as meet the increasing demands of regulatory bodies. In some corporations, the knowledge of a department's processes, important data, and motivation is kept internally within the department. This knowledge may exist in many forms, such as in mission documents maintained by managers, in documents stored online or in paper format, on intranet sites, or even in employees' heads. Often, knowing how best to interact with another department or accessing certain knowledge or data becomes a task in knowing the right person to call or bookmarking the right intranet page. Moreover, new employees are often at the most disadvantage as experience with other organizations or groups within the corporation is often the only way to gain an understanding of how a department works and why they operate the way the do.

The wealth of information maintained by a department about its inner workings can be unwieldy. From the broadest mission statement to the most minute implementation detail, the breadth and depth of the data that signifies how and why a department functions requires organization and consistency in order to be useful to those unfamiliar with the department.

In view of the foregoing issues, a need exists for convenient systems and methods that can more efficiently assist in the storage and organization of enterprise architecture content.

BRIEF DESCRIPTION OF THE FIGURES

The utility of the embodiments of the invention will be readily appreciated and understood from consideration of the following description of the embodiments of the invention when viewed in connection with the accompanying drawings.

FIGS. 5A-5B illustrate an author help screen in accordance with various embodiments; and FIGS. 6A-6B illustrate an editor in accordance with various embodiments.

FIGS. 7A-7B illustrate a file attachment utility in accordance with various embodiments;

FIGS. 8A-8C illustrate a screenshot of reference materials in accordance with various embodiments.

DESCRIPTION

The Zachman Framework for Enterprise Architecture is a known technique for providing a platform for organizing departmental material into a consistent and navigable structure. The Zachman Framework organizes architecture documentation into six primary categories each with five levels of granularity. The six categories generally break the information down into the 'who', 'what', 'why', 'where', 'when' and 'how' of a department's existence.

Although the Zachman Framework may provide a platform for organizing information, the techniques for implementing the framework may be improved. For example, organizations that attempt to use the Zachman Framework, or any other type of informational storage system, may compile an extremely large amount of printed materials, including reports, diagrams, tables, and lists. In some cases, three-ring binders containing information that is often incomplete, inconsistent, and potentially incorrect due to the laborious manner in which the information was maintained are used. These storage systems are typically rarely updated or referenced.

Figure 1A:
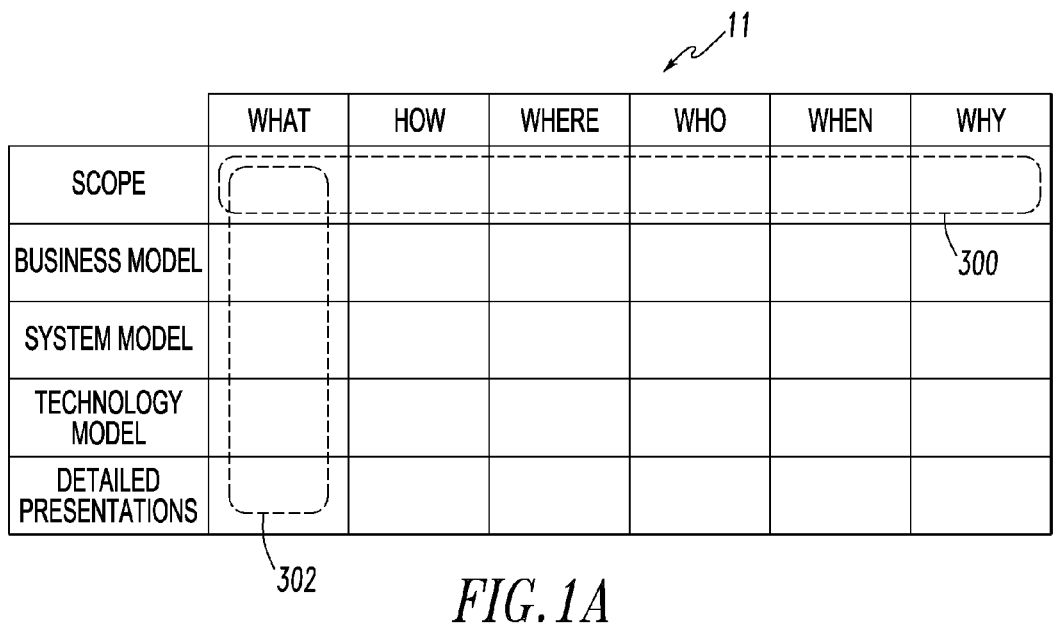
FIG. 1A includes a schema in accordance with various embodiments.
Figure 1B:
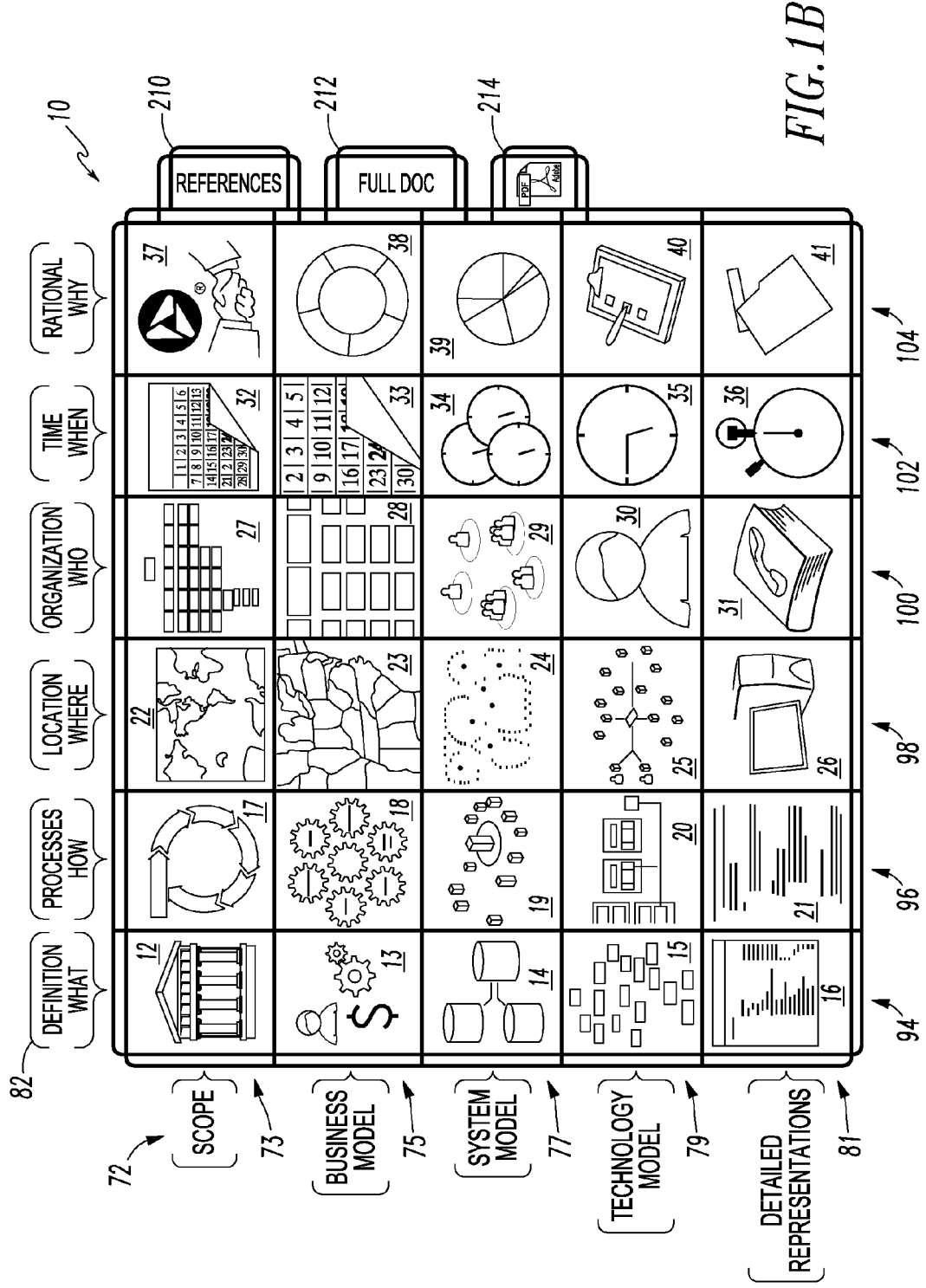
FIG. 1B includes a framework in accordance with various embodiments.

As discussed below, in various embodiments, a user-modifiable system and method is disclosed that provides dynamic and updatable webpages for storing and displaying information, such as enterprise architecture information. The information may be collected and accessed through a "wiki" interface. A wiki is a webpage or collection of webpages designed to enable users who accesses it to contribute or modify its content. As appreciated by those skilled in the art, a wild interface typically uses a simplified markup language. Various software platforms may be used to implement wild technology, such as TWIKI. As illustrated in FIG. 1A, the information stored may be grouped according to a schema 11. The schema 11 may define various levels 300 and categories 302 to create a framework 10 of units 12-41 (FIG. 1B). It is appreciated that various schemas 11 may be utilized. For example, some schemas may use different subject matter in the various levels and categories, or use different arrangement of the information. Additionally, some schema may utilize more or less levels and/or more or less categories, or arrange the information in non-grid formations.

Referring now to FIG. 1B, a sample embodiment of the framework 10 implementing the schema 11 is illustrated. The framework 10 may be a table or grid comprised of a plurality of individual units 12-41. The content of each level may be specified by a header associated with each level. For example, a level 73 relates to "Scope" content, a level 75 relates to "Business Model" content, a level 77 relates to "System Model" content, a level 79 relates to "Technology Model" content, and a level 81 relates to "Detailed Representations" content. It is appreciated that the headers and/or content for each level, or other type of grouping, may be modified for different applications. In this example, the level of detail provided in each level downwardly progresses from broad to narrow. For example, the content in the "Scope" level is broader than the content in the "Business Model" level, and the content in the "System Model" level is broader than the content in the "Detailed Representations" level. In various embodiments, the framework 10 may be the Zachman Framework for Enterprise Architecture, or a variant thereof, as described at http://www.zifa.com/. It is appreciated that various embodiments may employ varying level headers. Further, as illustrated in FIG. 1B, the individual units of the framework 10 may include graphics and/or text to help identify the content related to the unit.

The Scope level 73 may provide the broadest level of granularity or detail. For example, this level may hold information intended for a CEO level employee. With minimized technical details, this level may provide a general overview, and may be designed to portray the key ideas behind the details that are expressed in the lower levels.

The Business Model level 75, which still may be lacking technical terminology, may expand upon the ideas listed in the Scope level 73. In various embodiments, the information provided at this level may be most valuable to business units that interact with the department.

The System Model level 77 may focus on information for a first department that is valuable to other departments. For example, this level 77 may provide another department with information related to how best interact with the first department. Request systems, available services, and the means to utilize them may appear in this level.

The Technology Model level 79 may be dedicated to a more detailed view of the technologies used to implement the concepts described in the broader levels above. For example, application components and how they interact, infrastructure elements and their connectivity, and deployment details of purchased commercial products may appear in this level.

The Detailed Representations level 81 may include application source code, employee directories, IP address tables, or stock prices, for example. Links repositories of such information may be added when applicable.

The framework 10 may comprises a plurality of categories for each level. The content for each category may be specified by an associated header. For example, the framework may comprises a category 94 that specifies "Definition—What," a category 96 the specifies "Processes—How," a category 98 that specifies "Location—Where," a category 100 that specifies "Organization—Who," a category 102 that specifies "Time—When," and a category 104 that specifies "Rationale—Why." It is appreciated that the headers and content for the various categories may be modified for different applications.

The Definition—What category 94 may be used to house information about the data that is important to a department. For example, information such as server uptime, network throughput and request turnover times may fall into this category.

The Processes—How category 96 may be used to house information about the procedures a department follows on a regular basis. For example, the steps taken to acquire and install a new server, the process for making a change to a production system, and the procedure that employees must follow when making a request of the department are examples of information that may appear in this category.

The Location—Where category 98 may be used to house information about the physical location of a department's resources. For example, information related to where the department's employees are located, the position on the network of a departmentally owned or managed server, or a company's business operations footprint may appear in the documentation in this category.

The Organization—Who category 100 may be used to house information about the department's employees. For example, the different positions within the department and the skills required to perform those positions may appear in this category.

The Time—When category 102 may be used to house time-sensitive and repeating tasks. For example, the monthly, quarterly, and year-end freeze schedule, reoccurring capacity appraisals, yearly budget planning, and even employee evaluations may fit into this category.

The Rationale—Why category 104 may be used to house information about why a department's motivation. For example, the content may relate to providing a service, increasing revenue, and complying with a specific regulatory requirement are examples of items that may appear in this category.

Figure 2:
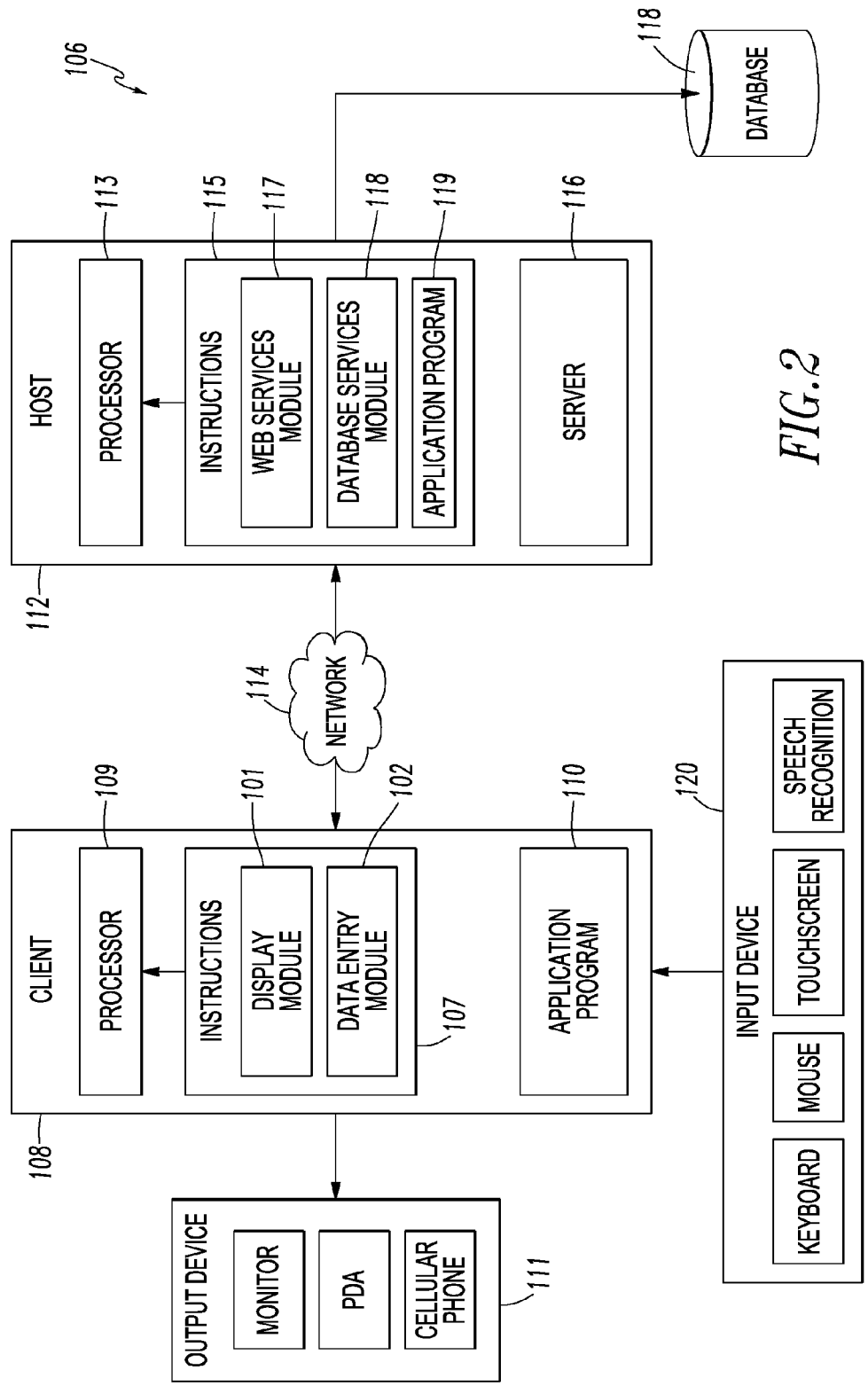
FIG. 2 is a diagram of a one embodiment of system for presenting the framework shown in FIG. 1 to a user.

FIG. 2 is a diagram of a system 106 for presenting the framework 10 (FIG. 1B) to a user according to various embodiments. The user may view the framework 10 on a client device 108, which may include an application program 110, such as a web browser, for displaying the framework 10. The client device 108 may also comprise a processor 109 that may execute instructions 107. The instructions 107 may be stored in a computer readable medium. The instructions 107 may include various modules, such as a display module 101 and a data entry model 102. The client device 108 may be any type of device capable of receiving, rendering and displaying the framework 10 such as, for example, a portable computer (PC), a laptop computer, a workstation, a cellular telephone, a kiosk, or a personal digital assistant (PDA), etc. The client device 108 may include an input device 120 to supply user input to the client device 108. The input device 120 may be, for example, a keyboard, a mouse, and/or a speech recognition module, for example. The input device 120 may be separate from or integrated with the client device 108. The client device 108 may comprise an output device 111. The output device 111 for displaying the framework 10 may be any suitable device, such as a monitor, PC, laptop, PDA, or cell phone, for example. The framework 10 may be, for example, part of a web page or other document that is served to the client device 108 from a host computing device 112 (referred to hereinafter as the "host") through a network 114. The host 112, which is shown as a single device in FIG. 2 but which may be embodied as a series of networked computing devices, may include a server 116 for generating the web pages or documents comprising framework 10 based on data stored in one or more databases 118. The host 112 may also comprise a processor 113 that may execute instructions 115. The instructions 115 may be stored in a computer readable medium. The instructions 115 may comprise various modules, such as a web services module 117, a database services module 118, and an application module 119. The server 116 may serve the generated web pages or documents via the network 114 to the client device 108.

Figure 3:
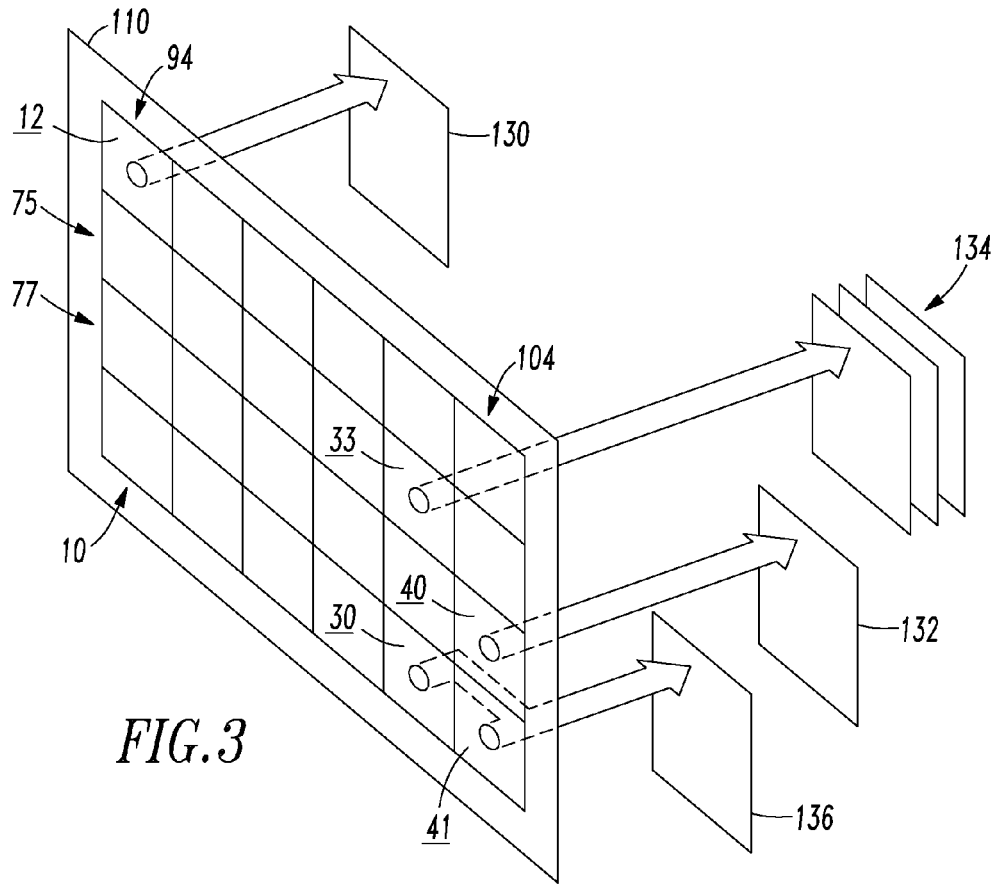
FIG. 3 is a diagram of the framework and associated webpages in accordance with various.

The framework 10 may be viewed on an application program 110, such as a web browser. As illustrated in FIG. 3, each unit 12-41 in the framework 10 may have a webpage associated it. For example, the unit 12 may have a website 130 associated with it. Similarly, the unit 40 may have a website 132 associated with it. As appreciated by those skilled in the art, certain units may have a plurality of associated webpages, such as webpages 134. Furthermore, in some embodiments, a single website 136 may be associated with a plurality of units of the framework 10. The content of the webpages associated with the units of the framework 10 may be stored in database 118 (FIG. 2), or any other suitable storage location. A user viewing the framework 10 may select an individual unit 12-41 to view the content on the associated webpage. For example, the user my "click" on the unit using the input device 120 (FIG. 2). In various embodiments, the user my select individual units by touching a touch screen, using a stylus, voice command, or any other suitable selection technique. After selecting the desired unit, the associated webpage may be displayed on the client device 108.

Figure 4A:
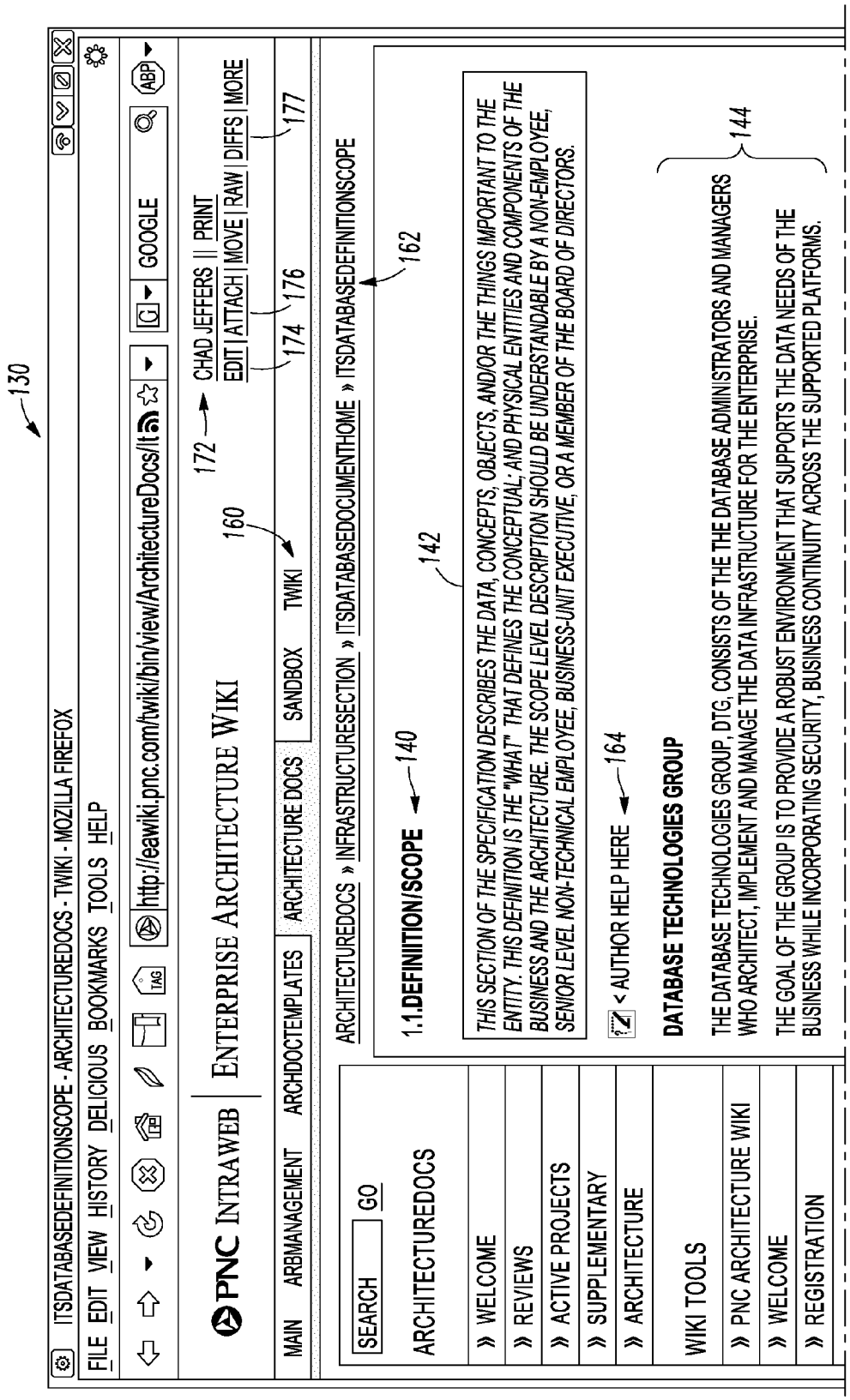
FIGS. 4A-4B illustrate a user-editable webpage in accordance with various embodiments.
Figure 4B:
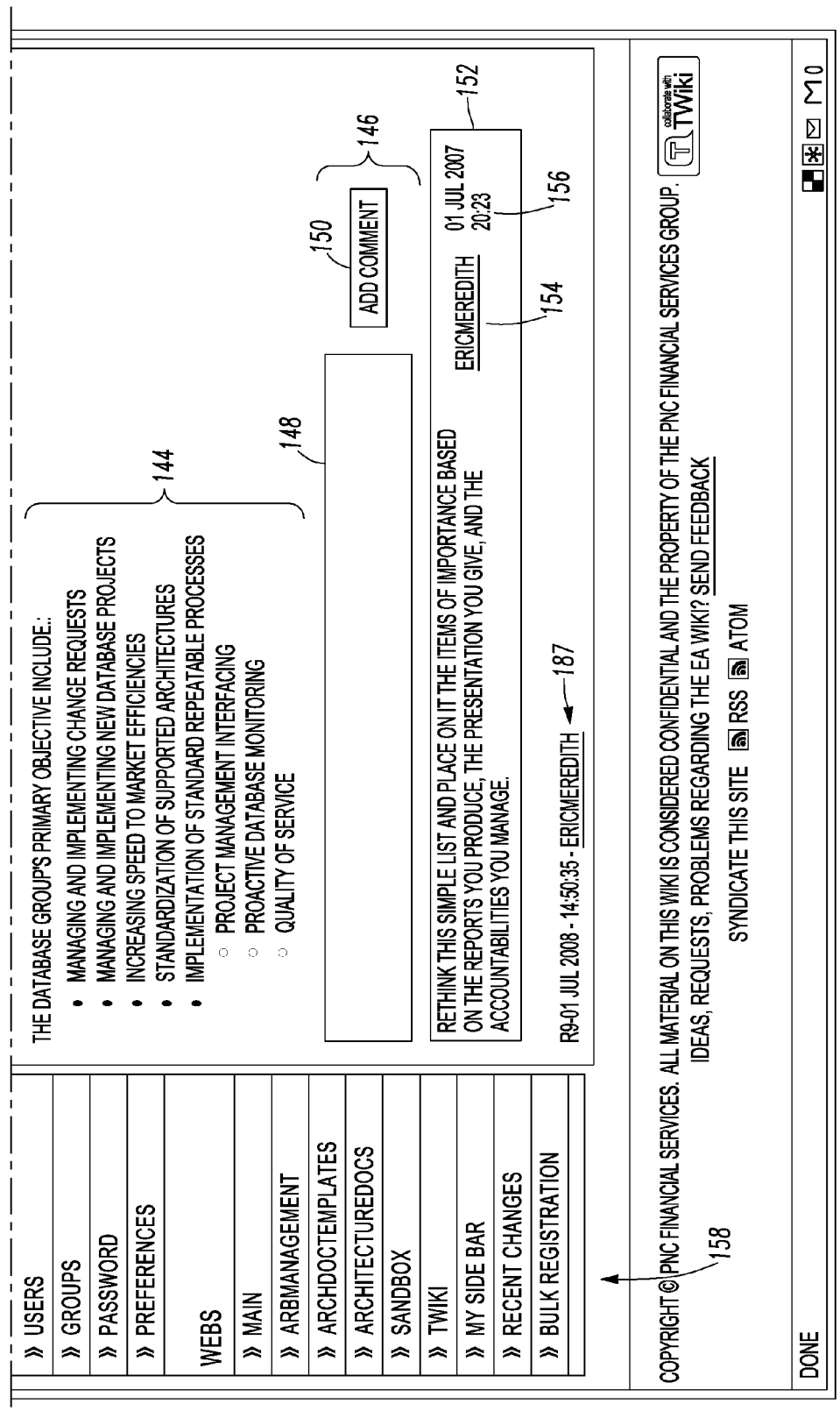

A sample embodiment of the webpage 130 is shown in FIGS. 4A-4B. In various embodiments, the webpage 130 may have a title field 140. In the illustrated embodiment, the title field 140 indicates the webpage 130 is associated with "Definition/Scope," or unit 12. The webpage 130 may also include a description box 142. The description box 142, for example, may describe the type of content or information that should be included on the webpage. The description box 142 may be perpetually displayed on the webpage 142 or may be selectably accessible. The webpage 130 may also include a content field 144. The content field 144 may be populated with relevant information. For example, content related to the "Definition/Scope" may be included on the webpage 130. In various embodiments, the content field 144 may include numbered lists, bulleted lists, outlines, graphics, flowcharts, paragraphs, tables, architecture diagrams, models, figures, schematics, drawings, hyperlinks, images, symbols, or any other type for form of content useful to the user. As appreciated by those skilled in the art the content or information displayed in the content field 144 may be specific to the scope of the unit associated with the webpage.

Still referring to FIGS. 4A-4B, in various embodiments the webpage 130 may include a comment entry section 146. The comment entry section 146 may include, for example, a comment entry field 148 and a comment button 150. Using the comment entry section 146 a user may selectively type comments into the comment entry field 148 and select the comment button 150. Upon selecting the button 150, the typed comments may appear in the comment list 152. Subsequent users viewing the webpage 130 may view the comments. As illustrated, the comment list 152 may include an author 154 and a timestamp 156. As appreciated by those skilled in the art, the webpage 130 may also comprise a menu 158 and/or other navigational tools, such as a set of tabs 160, or a hierarchical menu 162. In various embodiments, multiple menus, tabs, or hierarchical menus, may be used.

Figure 5B:
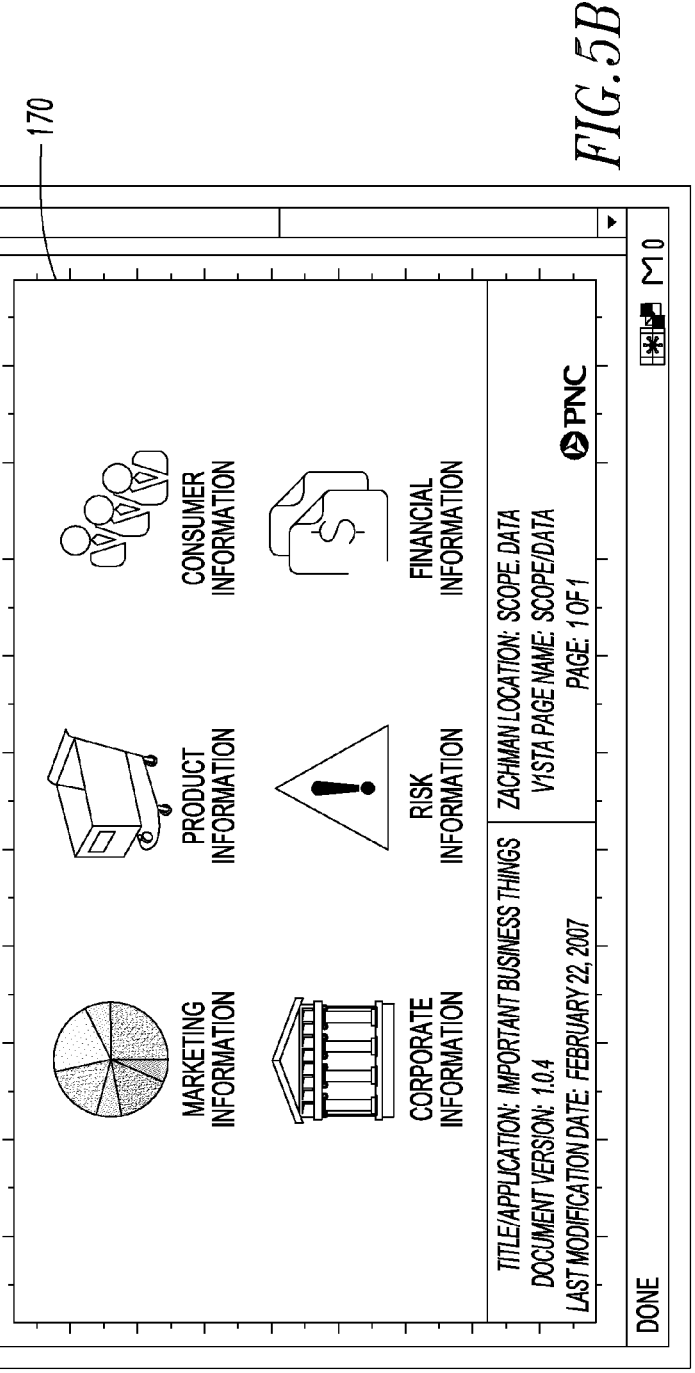

The webpage 130 may also include an author help feature 164. As shown in FIGS. 5A-5B, selecting the author help feature 164 may display a help screen 166. The help screen 166 may be displayed using any suitable technique, such as a separate webpage or a pop-up window, for example. In various embodiments, the help screen 166 may include a content section 168. The content section 168 may describe the type of content or information that should be included on the webpage, provide illustrations, and/or otherwise provide assistance. As illustrated, the help screen 166 may comprise a graphic 170 to assist the user.

Figure 6A:
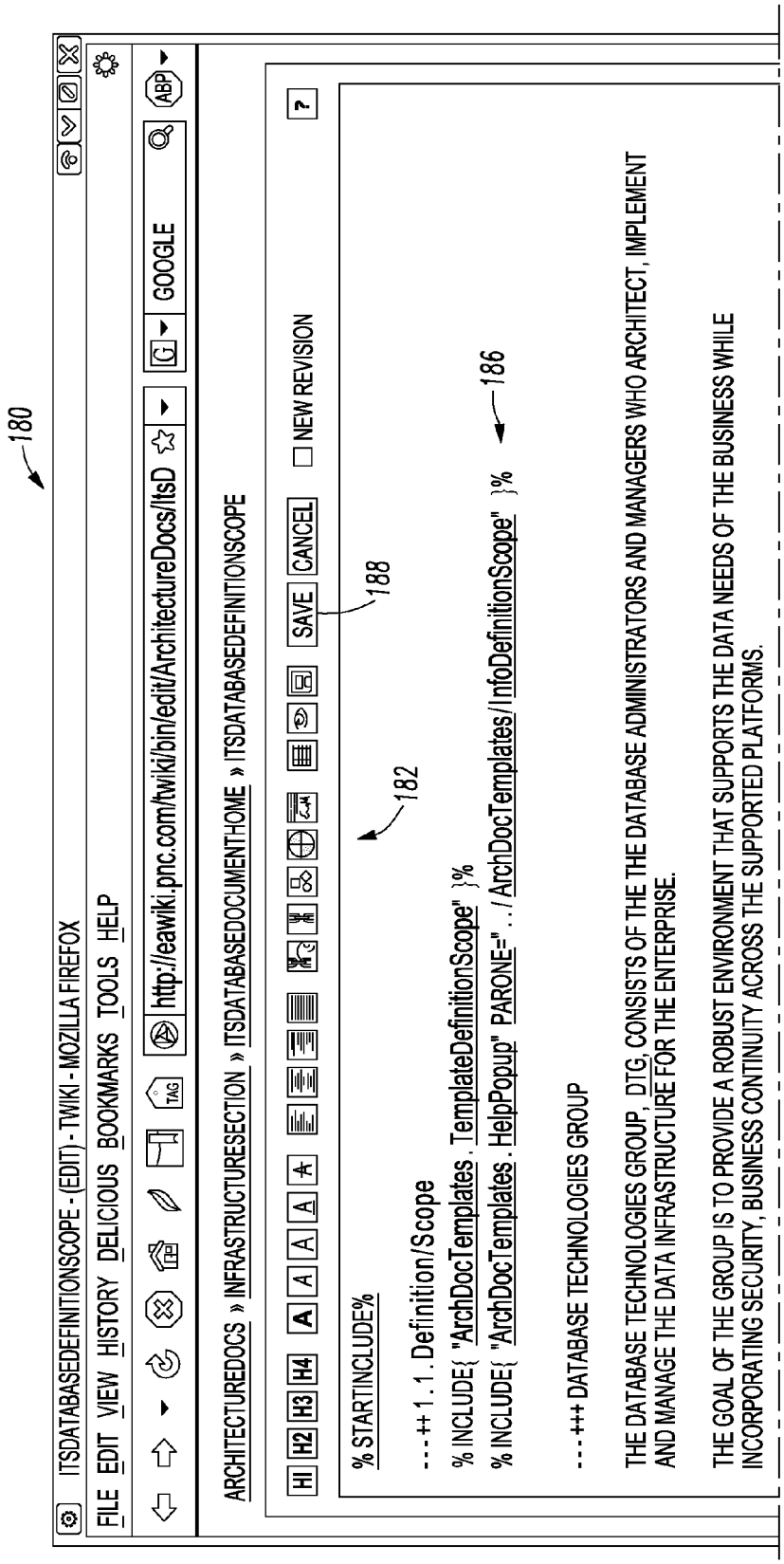

In various embodiments, as appreciated by those skilled in the art, the webpages associated with the units may incorporate "wiki" functionality or be managed as a wiki. Referring again to FIGS. 4A-4B, the webpage 130 may include a revision menu 172. The revision menu 172 allows for users to contribute or modify the contents of the webpage. In various embodiments the revision menu 172 may include a plurality of features for allowing a user to edit, revise, or otherwise amend the webpage 130. For example, the revision menu 172 may include an edit feature 174 and an attach feature 176. The revision menu 172 may be displayed in any suitable format, such as text-based (as illustrated), graphical based, or a combination of both. A user may select one of the features in the revision menu 172 using the input device 120. For example, as illustrated in FIGS. 6A-6B, if a user selects the edit feature 174, an editor 180 may be displayed.

The editor 180 allows the user to edit the content of the webpage 130. For example, the user may be able to edit the information contained in the content field 144. The editor 180 may include a formatting menu 182 for formatting the content of the webpage 130. The editor 180 may also include an edit field 184 that displays the content of the webpage 130. The edit field may include references to other documents, such as references to templates 186. The edit field 184 gives the user access to the content displayed on the webpage 130 so that the user can modify the information. Accordingly, the user may perform any edit to the content, such as revising, updating, deleting, or inserting. In various embodiments, certain universal formatting may be established to ensure consistency between the various entries. For example, a certain type of formatting may be established for first level headings, second level headings, or tables. Upon completing the change, the user may select a save feature 188. As illustrated, any comments present on webpage 130 may also be included in the editor 180. Once the change has been saved, the changes will be reflected on the webpage 130 the next time it is accessed by any user. The name of the last person to perform an edit or revision to page may be displayed in a footer 187 (FIG. 1). In various embodiments, other information may be included in the footer.

Figure 7A:
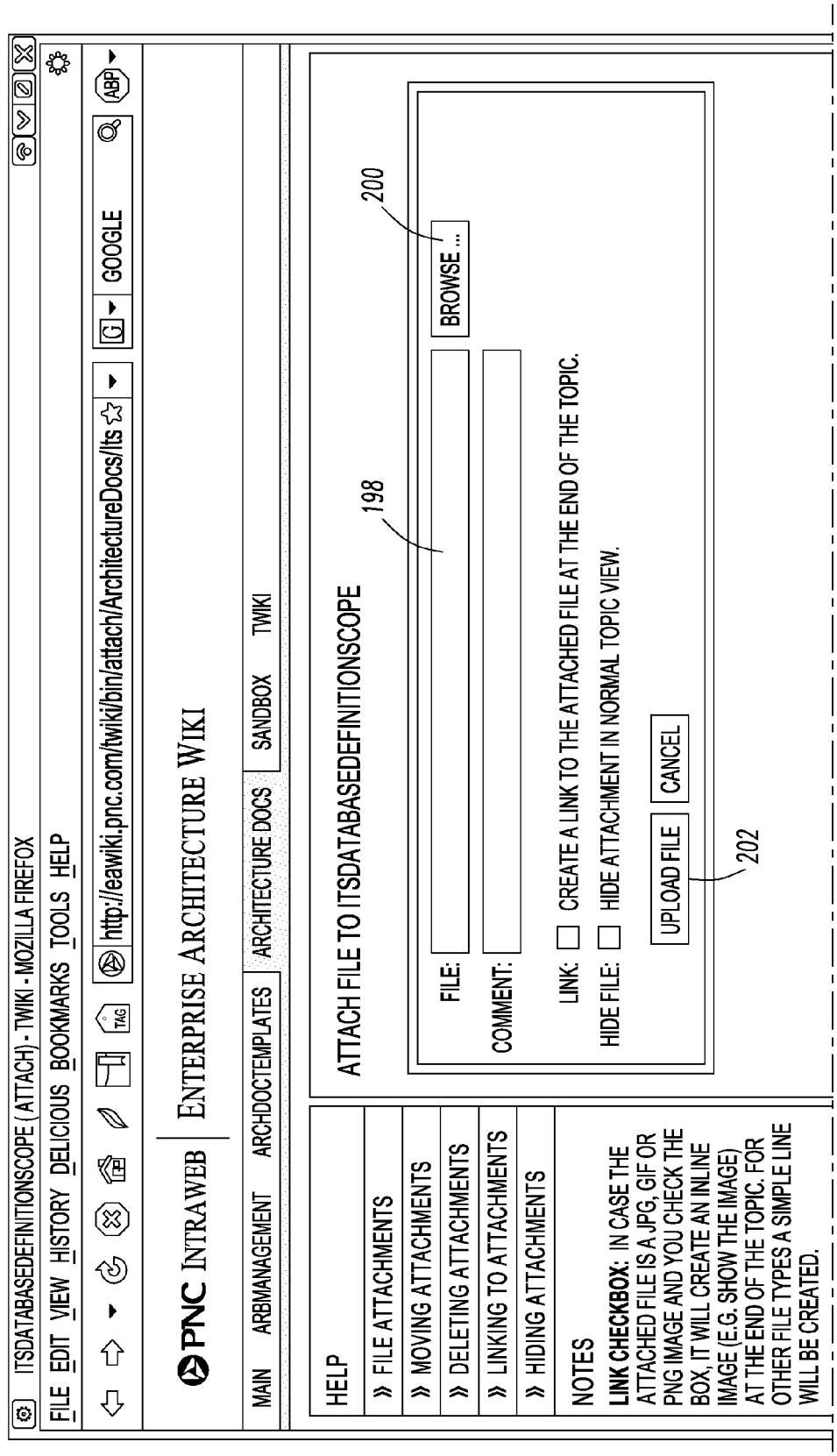

If a user selects the attach feature 176, an attach screen 196, as illustrated in FIGS. 7A-7B, may be displayed. Using the functionality of the attach screen 196, the user can selectably attach a file to the webpage 130. To attach a file, the user populates the file field 198 with a file name. The user may type the name or may use a browse feature 200 to locate the file on a hard drive, for example. The various versions of the attached files may also be stored and maintained for future reference. Once the file field 198 has been populated, the user may select the upload file field 202 to attach the file. In various embodiments, if an image file is attached, it may appear as an image inline with the content field 144. Some files, such as documents or PDF, may appear as a hyperlink on the website 130. As appreciated by those skilled in the art, when viewing the webpage 130, a user can select the hyperlink to access the attached document of file. In various embodiments, a graphical representation of the file, such as a JPG or GIF file may be uploaded so that it will appear inline with the text and content of the webpage 130. A version of the file from which the graphical representation was created, such as a VISIO file, may also be attached. Furthermore, a diffs feature 177 may be selected in order to view the various versions of the webpage. In some embodiments, individual versions may be viewed or multiple versions may be compared in a side-by-side format.

Referring again to FIG. 1, as outlined above, each unit 12-41 has at least one user-editable website associated with it. Accordingly, when viewing the framework 10, users may select a desired unit and view the associated webpages. Using the editing features described above, the user may edit or revise the content of any of the associated webpages. Using this functionality, users may maintain the correctness and completeness of the information. The framework 10 may also include other features, such as a reference feature 210, a full doc feature 212, or a PDF features 214. Those skilled in the art may appreciate that other features may be used, or the features may be displayed using various techniques, such as a text-based menu.

Figure 8A:
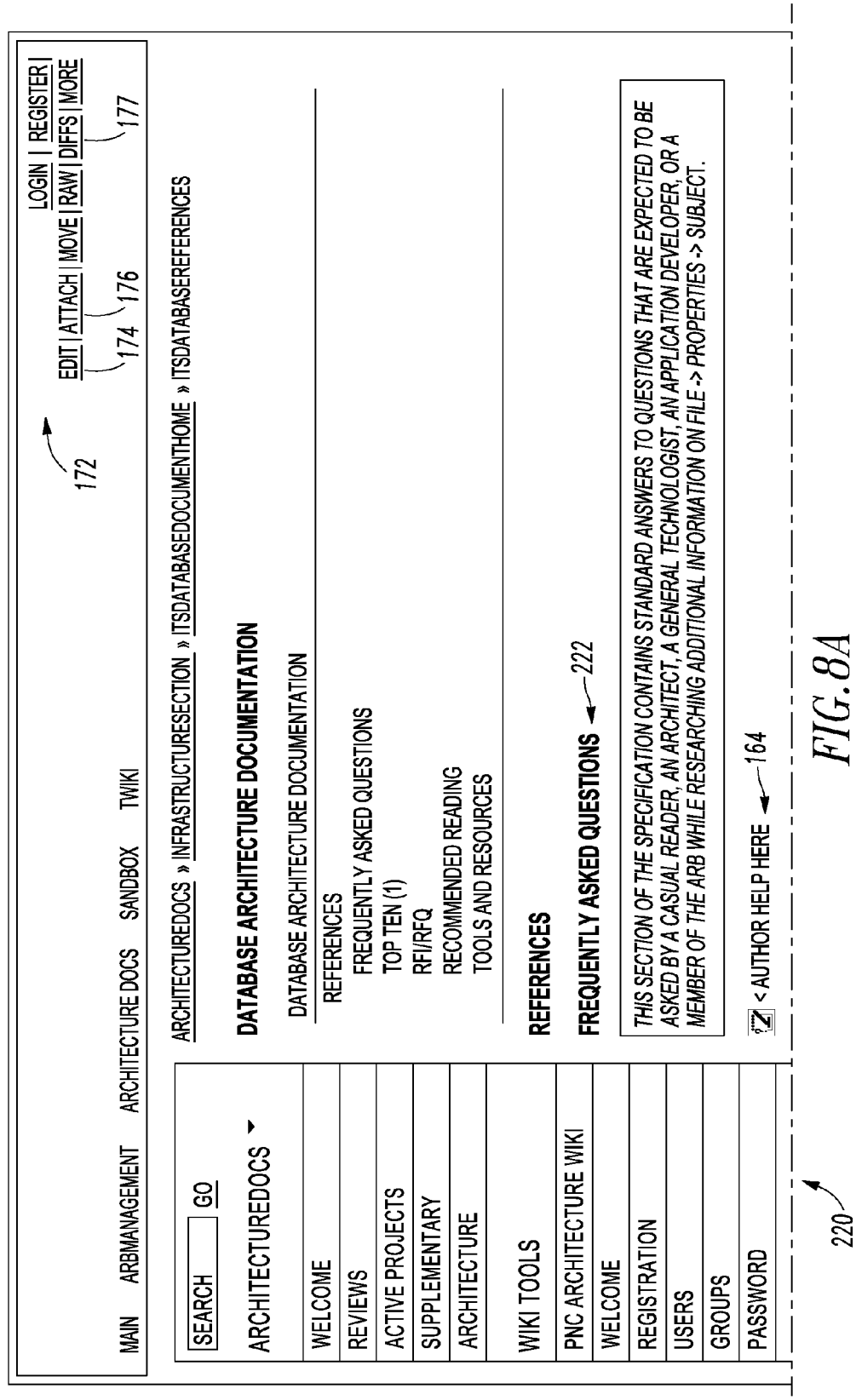
Figure 8B:
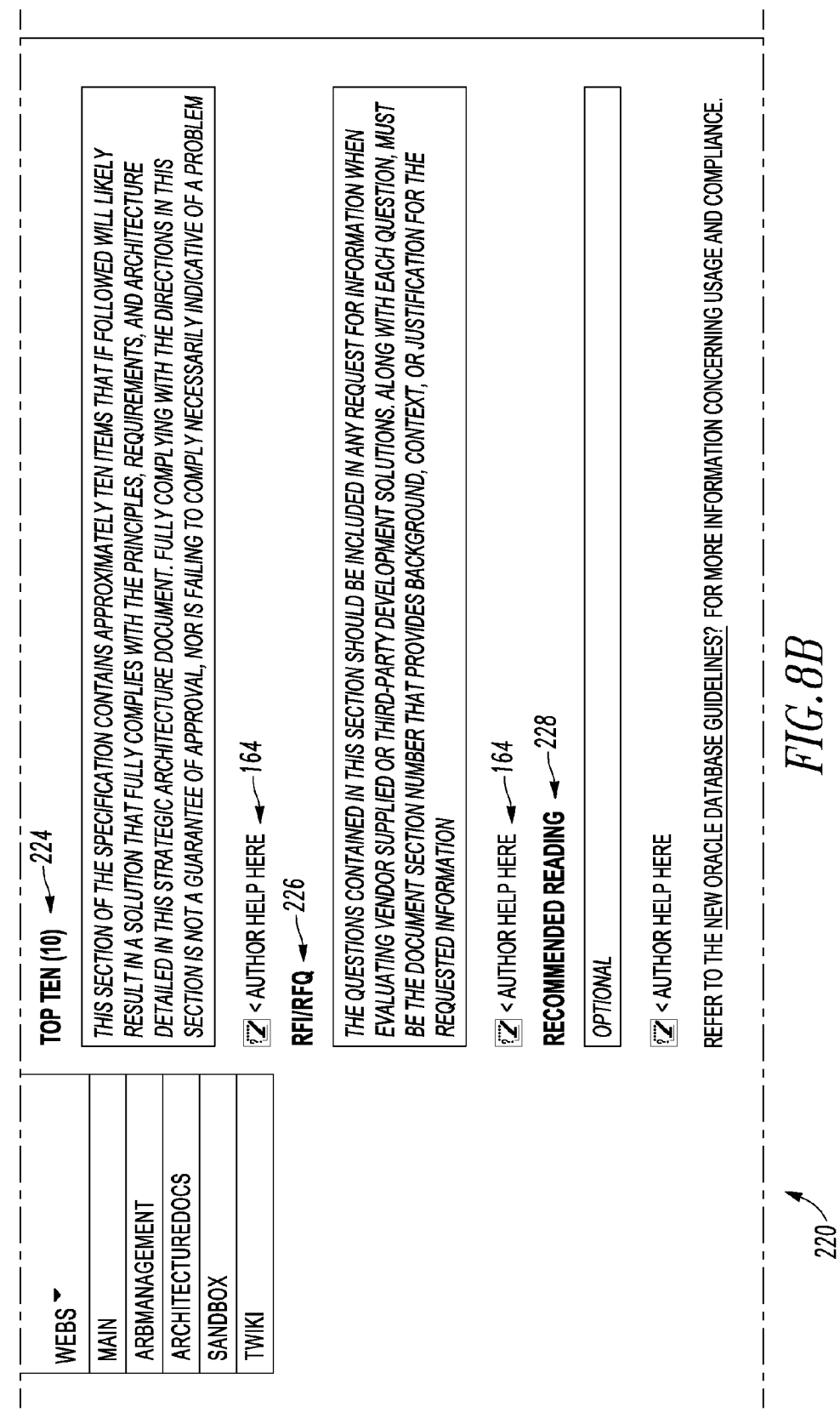

As shown in FIGS. 8A-8C, selecting reference feature 210 may access a reference page 220. As appreciated by those skilled in the art, the reference page 220 may be displayed in any suitable format, such as a webpage or a pop up screen, for example. The reference page 220 may include various sections to help the user. For example, the reference page may include a Frequently Asked Question section 222, a top ten section 224, a RFI/RFQ section 226, a Recommended Reading section 228, and/or a Tools and Resources Section 230. Various embodiments of the reference page 220 may include more or fewer sections. As illustrated, the various sections of the reference page 220 may include an author help feature 164. Furthermore, the content of the reference page may be modified for edited by the user. For example, the user could access an editor by selecting the edit feature 174 or attach a file by selecting attach feature 176.

The full doc feature 212 (FIG. 1) may also be selected by the user. Upon selecting the full doc feature 212 a window or page may be displayed to the user that compiles all of the content from webpages associated with the individual units 12-41 into a single window or page. Similarly, the PDF feature 214 may be selected which may provide the user with a compilation of all of the content from the webpages into a single PDF document. In various embodiments, the user can also select any category header, or other identifier or icon, to generate a document containing all of the content stored in that category. For example, if a user selects, or "clicks," on a Definition/What header 82 a webpage may be generated that includes the content from levels 73-81. Similarly, in various embodiments, the user can select any level header, or other identifier or icon, to generate a document containing all of the content stored in that level. For example, if a user selects, or "clicks," on a Scope header 72 a webpage may be generated that includes the content from units 12, 17, 22, 27, 32, and 37.

For corporations or businesses have multiple groups, units, divisions, or departments, it is appreciated that an individual framework 10 may be maintained for each individual group. In various embodiments, members of the internal group may access and continually update its framework 10 through an intranet, for example. Depending on the purpose and responsibility of the group, the content of the individual frameworks may vary. For example, a corporation might have a web application group, a network security group, a human resources group, an accounting group, a sales group, and a database group. Each of these groups may maintain a separate user-editable framework 10 to store and display information relevant to the group. The various units of the framework would provide varying levels of granularity for the various functions and purposes of the group. It is appreciated that a unit within a framework 10 for one group, may include links (such as hyperlinks) to a unit within the framework 10 of another group. It is also appreciated that varying levels of permissions may be granted to different users. For instance, only certain users may be given permission to make edits and/or attach files. Some implementations might utilize a Primary Content Owner who is responsible for maintaining the information, keeping it accurate and up to date.

It is appreciated that the user-editable webpages of framework 10 may be used in connection with a variety of institutional information and documentation, such as information related to enterprise architecture.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for receiving, storing and/or processing data for standalone application and/or over a networked medium or media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable memory media applied in association with embodiments of the invention described herein may include any memory medium capable of storing instructions executed by a programmable apparatus. Where applicable, method steps described herein may be embodied or executed as instructions stored on a computer-readable memory medium or memory media. These instructions may be software embodied in various programming languages such as C++, C, Java, and/or a variety of other kinds of software programming languages that may be applied to create instructions in accordance with embodiments of the invention. The software may be stored in a memory medium.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. A computer-implemented method for storing enterprise architecture, the method comprising:

defining a framework of a plurality of units, the plurality of units comprising enterprise architecture content, the framework comprising a plurality of levels and a plurality of categories grouping the enterprise architecture content among the plurality of units according to a category and a level of detail of the enterprise architecture content, wherein the level of detail of the enterprise architecture content grouped in each sequential level downwardly progresses from broad to narrow in each category, and wherein the levels grouping the enterprise architecture content comprise scope, business model, system model, technology model, and detailed representations;

displaying the framework using a computer system, wherein each unit in the framework corresponds to at least one user-editable webpage, wherein the at least one user-editable webpage is populated with enterprise architecture content, the enterprise architecture content stored in a computer memory medium;

facilitating individual selection of each of the plurality of units to display the corresponding at least one user-editable webpage;

facilitating with an online editor a modification of the enterprise architecture content of the at least one user-editable webpage;

storing the modification of the enterprise architecture content in a computer memory medium; and displaying the modification of the enterprise architecture content on the at least one user-editable webpage.

2. The method of claim 1, wherein the categories grouping the enterprise architecture content comprise definition, processes, location, organization, time, and rationale.

3. The method of claim 1, further comprising attaching a file to the at least one user-editable webpage.

4. The method of claim 1, further comprising selectably displaying an author help window.

5. A computer implemented system for storing enterprise architecture, the computer implemented system comprising:
a computer memory medium;
a visual display comprising a framework of units, wherein the framework comprises a set of levels and a set of categories allocating enterprise architecture content among the framework of units according to a category and a level of detail of the enterprise architecture content, wherein the framework is displayed on a webpage and stored in the computer memory medium;
a plurality of user-editable webpages stored in the computer memory medium, wherein at least one user-editable webpage corresponds to each unit in the framework, wherein the user-editable webpages are populated with the enterprise architecture content, wherein the enterprise architecture content is stored in a computer memory medium, wherein the level of detail of the enterprise architecture stored in the framework downwardly progresses from broad to narrow between vertically sequential levels in each category, wherein the levels comprise scope, business model, system model, technology model, and detailed representations, and wherein each user-editable webpage is accessed with an input device; and
an editor programmed to permit a plurality of users to view and edit the enterprise architecture content on the user-editable webpages via a webpage interface; wherein the edited enterprise architecture content is stored in a computer memory medium.

6. The system of claim 5, further comprising a module programmed to compile the content of the plurality of user-editable webpages into a single webpage.

7. The system of claim 1, wherein the categories comprise at least definition, processes, location, organization, time, and rationale.

8. The system of claim 7, further comprising a module programmed to compile the content of the plurality of user-modifiable webpages into a file.

9. The system of claim 8, wherein the plurality of user-editable webpages are editable via a wiki interface.

10. A method for storing and organizing enterprise architecture, the method comprising:
displaying a framework of units on a webpage using a computer system, the framework comprised of a plurality of levels and a plurality of categories allocating enterprise architecture content and enterprise architecture;
determining a schema to specify subject matter of the plurality of levels and the plurality of categories of the framework of units,
wherein the specified subject matter of each level varies in detail, wherein the detail downwardly progresses from broad to narrow between vertically sequential levels in each category, and
wherein the specified subject matter levels comprising scope, business model, system model, technology model, and detailed representations;
associating at least one user-editable webpage with each unit in the framework;
displaying at least one user-editable webpage upon selection of a unit by a user, the at least one user-editable webpage displaying the enterprise architecture content, wherein the specified subject matter defines the enterprise architecture and the enterprise architecture content is dependent upon the location of the associated unit within the framework;
modifying the content of the user-editable webpage via an online editor;
storing the modified content in computer memory medium; and
displaying the modified content on the user-editable webpage.

11. The method of claim 10, wherein the schema specifies subject matter categories comprising definition, processes, location, organization, time, and rationale.

12. The method of claim 11, further comprising attaching a file to at least one user-editable webpage.

13. The method of claim 12, further comprising selectably displaying an author help window.

14. A computer implemented system, the computer implemented system comprising:
a computer memory medium;
a plurality of user-editable webpages, wherein each user-editable webpage includes enterprise architecture content, wherein the enterprise architecture content is stored in the computer memory medium, wherein the plurality of user-editable webpages are managed as a wiki;
a framework of units displayed on a web application using a computer system, wherein each individual unit of the framework is associated with the user-editable webpage;
an input device is configured to receive an input from a user, wherein a selection of the individual unit is associated with the user-editable webpage;
a schema designating a plurality of categories and a plurality of levels of the framework of units, wherein the plurality of categories and plurality of levels define the enterprise architecture content of the associated user-editable webpage accessed through each individual unit, the schema providing a level of detail for the enterprise architecture content included on each user-editable webpage, wherein the level of detail downwardly progresses from broad to narrow between sequential levels in each category, and wherein the levels comprise scope, business model, system model, technology model, and detailed representations; and
a computer-based online editor is configured to edit the enterprise architecture content via the web application.

* * * * *